United States Patent [19]

Lill

[11] Patent Number: 4,839,645

[45] Date of Patent: Jun. 13, 1989

[54] WEATHER DATA TRANSMITTING SYSTEM

[76] Inventor: Thomas M. Lill, 3120 Brownwood Dr., Port Huron, Mich. 48060

[21] Appl. No.: 82,234

[22] Filed: Aug. 6, 1987

[51] Int. Cl.$^4$ ............................................. G08C 19/12
[52] U.S. Cl. ........................... 340/870.17; 340/870.16; 455/39; 455/70
[58] Field of Search ....................... 340/870.17, 870.13, 340/870.16, 870.11, 718; 455/39, 70, ; 370/77, 100

[56] References Cited

U.S. PATENT DOCUMENTS

| | | | |
|---|---|---|---|
| 4,163,216 | 7/1979 | Arpino | 340/870.13 |
| 4,319,241 | 3/1982 | Mount | 340/870.17 |
| 4,509,199 | 4/1985 | Ichihara | 455/70 |
| 4,577,315 | 3/1986 | Otsuka | 455/70 |
| 4,635,055 | 1/1987 | Fernandes et al. | 340/870.17 |
| 4,680,585 | 7/1987 | Fasching | 340/870.13 |

Primary Examiner—John W. Caldwell, Sr.
Assistant Examiner—Tyrone Queen
Attorney, Agent, or Firm—Antonelli, Terry & Wands

[57] ABSTRACT

A system is disclosed for transmitting a sensed temperature from a transmitter to a remote receiver over a modulated carrier through the atmosphere. The transmitter and the receiver are battery powered and include timing circuitry having low power consumption. The transmitter and the receiver are both cyclically turned on for a relatively short period and off for a relative long period with the receiver's on cycle being synchronized with the occurrence of the transmission of the modulated carrier. The receiver further employs techniques to minimize the effect of noise on the reception of the transmitted data which can occur from extraneous signal sources broadcasting in the same frequency band or from environmental noise.

23 Claims, 9 Drawing Sheets

WEATHER DATA TRANSMITTING SYSTEM

FIELD OF THE INVENTION

The present invention relates to systems for transmitting weather data, such as temperature, by atmospheric transmission of a modulated carrier between a transmitter located at a first location to a receiver located at a second location. More particularly, the present invention relates to systems of the aforementioned type in which the transmitter and receiver each have a low power consumption which permits their operation from a battery power supply over an extended time.

DESCRIPTION OF THE PRIOR ART

Systems for transmitting a sensed temperature from one location, such as the exterior of a building, to a second location, such as the interior of a building, over a wire cable are known. These systems typically sense an analog parameter such as the voltage drop across a forward biased diode to determine temperature. One disadvantage of these systems is the requirement that the wire cable must extend from the exterior to the interior which typically requires the drilling of a hole through an exterior wall which is time consuming and violates the integrity of the seal between the exterior and the interior. Moreover, these systems suffer from the further disadvantage that the length of the cable limits the distance between the transmitter and receiver. Finally, the cable may be subject to damage if it is exposed to contact which can interrupt transmission.

Systems are known which measure the temperature of an object and transmit the measured temperature to a remote receiver. See U.S. Pat. Nos. 2,818,732, 3,045,488, 3,549,989, 3,582,921, 3,609,728, 3,641,538, 3,713,124, 3,766,535, 3,800,300, 3,949,388, 4,025,912, 4,140,999, 4,180,199, 4,184,159, 4,268,818, 4,295,139, 4,356,486, 4,363,137, 4,447,805, 4,471,354, 4,518,839, 4,518,962 and 4,557,608. None of the aforementioned patents provides a temperature measuring system having a battery powered transmitter and receiver which are operable over extended periods of time without the replacement of batteries.

The Federal Communications Commission permits certain radio frequency ranges to be used for diverse usages such as radio telephones, garage door openers and personal safety devices without consideration that more than one transmitter may transmit on the same frequency band to create radio interference. In order to insure the transmission of valid data in these bands, it is necessary to discriminate valid data from extraneous signals and to discard the extraneous signals. A specific Federal Communications classification exists which regulates transmitters which are cyclically turned on for intervals of less than one second and are off for at least 30 times this interval (47 C.F.R. §15.122).

SUMMARY OF THE INVENTION

The present invention provides a weather data transmitting system which transmits data from a transmitter to a remote receiver through the atmosphere by modulation of a carrier with both the transmitter and the receiver being battery powered. In view of the transmitter and the receiver being battery powered, the invention limits the consumption of power by the transmitter by limiting the time interval during which the transmitter is active to transmit weather data and limits the consumption of power by the receiver by limiting the time interval during which the receiver is active to receive transmitted data. A low power clock, which may be implemented in CMOS, is used to control the cyclical turning on and turning off of both the transmitter and the receiver. Synchronization of the receiver with the transmitter is produced by controlling the turning on of the receiver synchronously with the transmission of data by the transmitter to ensure that valid data is not lost. The overall time during an on and off cycle that the transmitter and the receiver are active may be adjusted to regulate the consumption of power to provide a long time interval during which the batteries do not have to be replaced.

The receiver of the present invention further distinguishes valid data from noise which is present on the reception band of the receiver in a number of ways. First, the receiver is designed to be turned on for a short time interval synchronous with the reception of valid data and turned off for a relatively long period. Typically, the on period may be approximately one second and the off period may be approximately 180 seconds although the invention is not limited to these intervals. Since the receiver is synchronously turned on with transmissions of the transmitter for only a short period of time, statistically the probability of random noise within the frequency band of the receiver being received is reduced. Moreover, the receiver contains an internal timer which times the duration during which a signal within the reception band is received and compares that duration to the desired time length of transmissions of valid data by the transmitter. If the receiver receives a transmission in the frequency band of reception which differs in time duration from the desired transmission time length of valid data by an amount greater than a predetermined deviation, the receiver discards the data received during the transmission as invalid data. This technique eliminates transmissions occurring from radio telephones, garage door openers, personal safety devices, etc. in the frequency band of reception of the receiver which are permissive under Federal Communication Commission frequency allocations for the reason that it is statistically unlikely that transmissions from these sources would have a time duration close to the time duration of valid data that the transmitter is designed to transmit. Furthermore, a plurality of successive transmissions of data may be statistically averaged and used to compare the next received data transmission to determine if it is likely to be erroneous. For example, if the currently received data transmission varies by more than 15 or 20% from the average, the currently received data may be discarded unless it is determined that subsequent data transmissions are close in magnitude to the current data transmission which differ significantly from the previous average in which case the current data will be used to update the display of the transmitted data.

In the preferred embodiment, a radio frequency carrier is FM modulated with a voltage controlled oscillator having a frequency which is a function of a sensed weather parameter to be transmitted such as temperature. The receiver receives the FM modulated carrier, detects it and produces a resultant count. The count is used as an address of the stored weather data to be displayed, such as temperature, contained in a memory located at the receiver. This mechanism provides both a simple and reliable way of transmitting weather data without requiring complicated signal processing by the receiver. The received data from each transmission may be broken up into a plurality of equal time intervals distributed over the entire length of the received data to facilitate the use of a smaller capacity counter for generating the address in a temperature memory of temperature data to be displayed and to lessen the number of temperature values which must be stored in memory.

Preferably, the receiver is controlled by a programmed microprocessor. In view of the fact that the cyclical transmission of data by the transmitter occurs at a low frequency rate such as, but not limited to, once every 80 seconds, it is possible to operate the microprocessor at the receiver at an extremely low clock rate which further lessens power consumption for the reason that CMOS circuitry, which is the preferred implementation of the receiver microprocessor, only consumes power during change in states.

In a second embodiment of the present invention, the transmitter contains a plurality of sensors for detecting different weather parameters such as, but not limited to, temperature and wind speed. In this embodiment, the transmitter operates in the same manner as the embodiment in which a single sensor's data is transmitted except that the transmission interval during which the transmitter is active is time multiplexed to permit a plurality of different sensors data to be transmitted. The receiver functions identically to the receiver for processing the transmitted data from a single sensor except that the programmed microprocessor time multiplexes the processing of the received data synchronously with the transmission of the data to ensure the display of valid data on various display devices such as a temperature indicator, a wind speed indicator, and wind chill indicator. For example, if a temperature sensor and a wind speed sensor are utilized by the transmitter to transmit temperature and wind speed data, the receiver may be used to display the received temperature and wind speed data and to further display wind chill by the use of a look-up table at the receiver which utilizes the detected wind speed and temperature to address the corresponding wind chill in the look-up table for common variations in temperature and wind.

A system for transmitting a temperature sensed by a sensor disposed at a first location to a second location by modulation of a carrier with a signal which is a function of the sensed temperature transmitted by atmospheric transmission of the carrier between the first and second locations in accordance with the invention includes a transmitter, which is cyclically turned on to transmit the carrier which has been modulated by the sensed temperature during a first time interval and turned off during a second time interval; a transmitter clock, coupled to the transmitter, for controlling the cyclical turning on and off of the transmitter during the first and second time intervals; a battery power supply for providing operating power to the transmitter; a receiver, disposed at the second location which is cyclically turned on for receiving the modulated carrier during a third time interval and turned off during a fourth time interval, the receiver including a detector for detecting the sensed temperature modulating the carrier, a display for displaying the sensed temperature, and a receiver clock for controlling the cyclical turning on and off of the receiver during the third and fourth time intervals, the fourth time interval starting in response to a change in the level of the received modulated carrier and a battery power supply for providing operating power to the receiver. The fourth time interval is less than or equal to the duration of the second time interval; the first time interval is equal to or less than the duration of the third time interval; and the sum of the first and second time intervals is equal to the sum of the third and fourth time intervals when the transmitter and receiver are synchronized.

The receiver may further include a memory having a plurality of addressable locations with each location storing a temperature and circuitry for reading a temperature stored in the memory corresponding to the detected signal and wherein the display displays the temperature which has been read from the memory. The detected signal may be the address (pointer) in the memory which stores the temperature to be displayed.

The transmitter includes a voltage controlled oscillator having an output frequency which varies in direct proportion to the sensed temperature.

The transmitter and receiver clocks each have a source of a constant frequency signal; and a counter, coupled to the source of a constant frequency signal, for counting the cycles of the constant frequency signal and producing a plurality of selectable output signals each of a different duration, one of the outputs producing a signal of the first time interval or a signal of the third time interval and another of the outputs producing a signal of the second time interval or a signal of the fourth time interval.

The receiver includes an audio detector for detecting the signal which modulates the carrier transmitted between the transmitter and the receiver which has a first level when the signal is within a predetermined frequency range for at least a predetermined time duration and a second level when a signal is not detected within the predetermined frequency range for the predetermined time duration. Further, a comparison is made to compare the duration of the signal of the first level with a predetermined duration and causing the detected signal to be used for addressing the temperature to be displayed when the duration of the signal of the first level differs from the predetermined duration by an amount less than a predetermined time duration.

The audio detector produces a pulse train from the received carrier with the pulse train having a frequency proportional to the sensed temperature, and includes a counter for counting the number of pulses present in the pulse train which occur during a predetermined time interval with the count produced by the counter being the address of the location in the memory which stores the temperature to be displayed.

The receiver further includes a detector for detecting when the modulated carrier is not detected during the third time interval for a predetermined number of the on and off cycles of the receiver and means responsive to the means for detecting for detecting when the modulated carrier is not being detected for a predetermined number of cycles for turning the receiver continually on until the modulated carrier is again received to ensure resynchronization of the receiver with the transmitter.

As used herein "atmospheric transmission" means the transmission of data by broadcast from a transmitter antenna to a receiver antenna.

DESCRIPTION OF THE PREFERRED EMBODIMENTS

Figure 1:
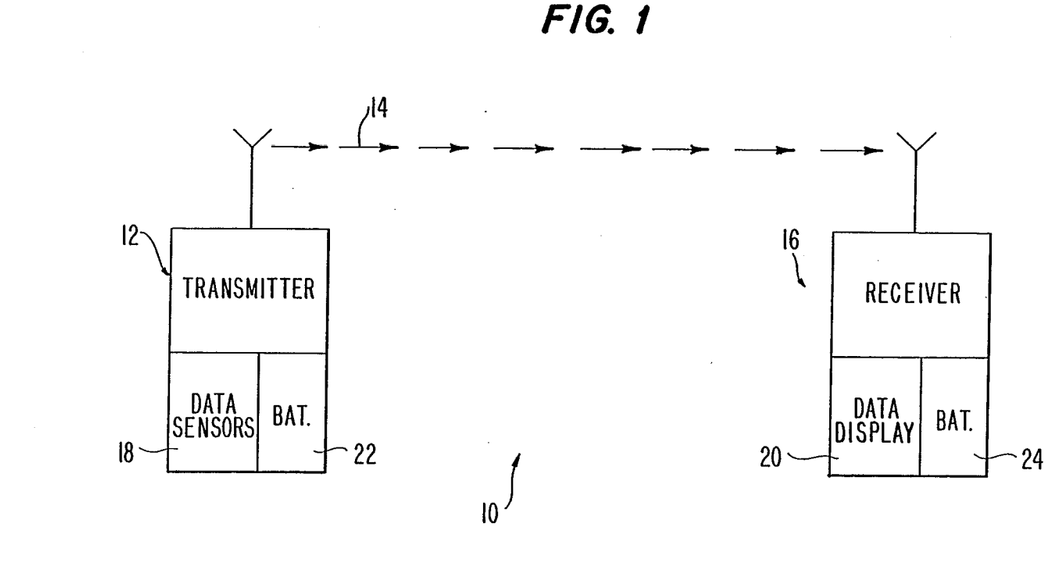
FIG. 1 is a system diagram of the present invention.

FIG. 1 illustrates a system 10 for transmitting weather data from a transmitter 12 via a modulated carrier 14 which is sent as a series of cyclical transmissions to a receiver 16. The transmitter 12 contains one or more data sensors 18 which preferably sense weather data to be transmitted to the receiver 16 for display on a data display 20. The transmitter is battery powered by a battery 22 which may be a commercially available 9 volt battery such as that used for small radios. The receiver also contains a battery power supply 24 which may be three C cells. In the preferred embodiment of the invention, the modulated carrier 14 is modulated by the data sensed by the data sensors 18 and is sent as a series of short transmissions to the receiver 16 through the atmosphere. Each transmission of the modulated carrier may be approximately one second long followed by an off time of approximately 180 seconds although the invention is not limited thereto. The relatively short on time and the relatively long off time is important in conserving the power of the batteries 22 to provide a long time period during which the batteries do not require replacement. When the transmitter 12 is operated by a 9 volt commercially available battery in which the transmissions of the modulated carrier are on for a relatively short period of time and the transmitter is turned off for a relatively long period of time as explained above, it is possible to have the transmitter intermittently operated for a period of many months without battery replacement. Moreover, the transmitter is provided with a series of jumpers, not illustrated, in FIG. 1, which are explained below with reference to FIG. 2, that permit the selection of the relative on and off times of the transmitter to control the frequency of updating the data display 20 and the battery life. The receiver 16 also is turned on for a relatively short period of time and turned off for a relatively long period of time in a manner which is synchronous with the turning on and off of the transmitter 12 in a manner explained below in detail. The turning off of the receiver 16 is synchronized in response to the reception of the modulated carrier and the off time of the receiver 12 is chosen to be less than or equal to the off time of the transmitter to ensure that the receiver is operating when the modulated carrier 14 is actually received. The rising edge or the trailing edge of the modulated carrier 14 may be used to synchronize the off interval of the receiver 16 in a manner explained below.

The data sensors 18 may be a single temperature sensor or a plurality of sensors of weather data such as, but not limited to, temperature and wind speed. The data display 20 contains a display, such as an LCD display, for each of the data items which are sensed by the data sensors 18. The data display may contain displays for temperature, wind speed, wind chill and other weather data. As will be explained below, wind chill may be computed from temperature and wind speed which are transmitted from the transmitter 12. Both the transmitter 12 and receiver 16 preferably have a CMOS internal clock which provides the time base for the cyclical turning on and off of both the transmitter and the receiver.

Figure 2:
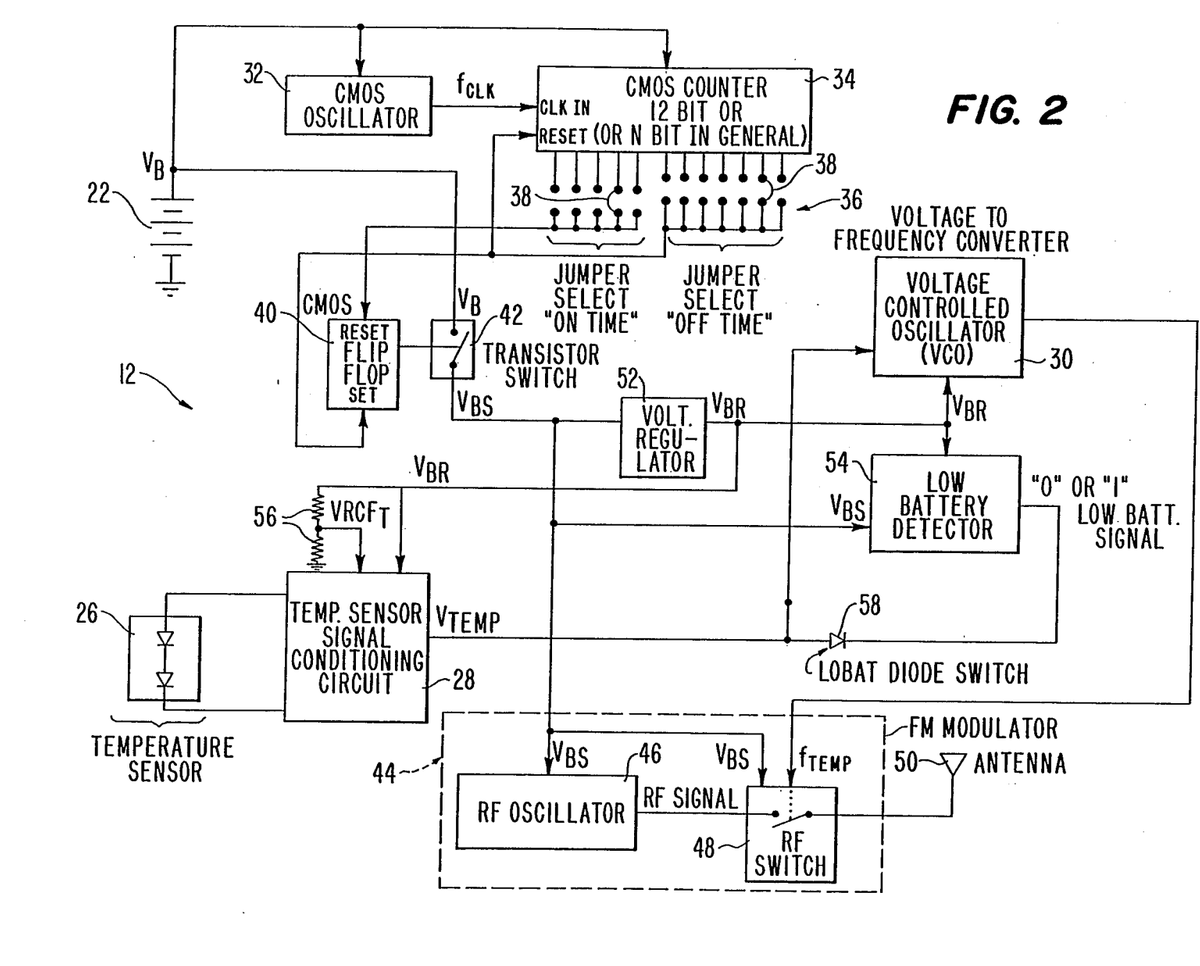
FIG. 2 is a block diagram of a transmitter which may be used with the present invention.

FIG. 2 illustrates a block diagram of an embodiment of a transmitter 12 in accordance with the present invention. The embodiment of FIG. 2 transmits a sensed temperature produced by temperature sensor 26. Preferably, the temperature sensor is a pair of series connected silicon diodes which have a known voltage characteristic which varies as a linear function of temperature. The diode drop of a silicon diode varies $-2.2$ millivolts per degree centigrade which permits the temperature to be accurately measured as a linear function of the diode drop. A temperature sensor signal conditioning circuit 28 is provided which senses the aforementioned characteristic of the series connected silicon diodes 26 to produce an output voltage $V_{TEMP}$ which is used to control the oscillation frequency of a voltage controlled oscillator 30 of conventional construction as described below. Specifically, the output voltage $V_{TEMP}$ is a linear function of the temperature which causes the voltage controlled oscillator 30 to vary in frequency in a linear manner with temperature. Battery 22 supplies operating power to the transmitter during the time that it is on and continually applies power to the CMOS clock which controls the on and off interval of the transmitter.

The clock is comprised of the combination of a CMOS oscillator 32 and a CMOS counter 34 which may be a 12 bit counter. The counter 34 produces output signals controlling both the on time of the transmitter and the off time of the transmitter as follows. The CMOS oscillator 32 oscillates at a steady frequency $f_{clk}$ which is applied to the CMOS counter 34. The CMOS counter 34 has a plurality of outputs 36 which may be individually selected by a pair of jumpers 38 for selecting signals controlling the on and off times of the transmitter. The respective outputs of the counter 34 are related to each other by division of powers of two such that each successive output represents the division of the frequency $f_{clk}$ by an additional factor of two. Thus, the signal controlling the relatively short on time of the transmitter 12 may be selected by choosing one of the outputs representing the division of the frequency $f_{clk}$ by a relatively low power 2 while the signal controlling the relatively long off time may be selected by the choosing one of the outputs representing a relatively high power of 2. The jumper 38 for selecting the on time applies a signal to the reset terminal of flip/flop 40. The jumper 38 for selecting the off time applies a signal to the set terminal of the flip/flop 40. Resetting of the flip/flop 40 causes the transistor switch 42 to be closed to apply the potential of battery 22 to the various circuits in the transmitter requiring power including the voltage control oscillator 30 and FM modulator 44. The FM modulator 44 is comprised of an RF oscillator 46 which supplies the basic frequency of the modulated carrier 14 and an RF switch 48 having an input voltage which is the output from the voltage control oscillator 30 to cause FM modulation of the basic carrier frequency produced by the RF oscillator. An antenna 50 is provided for broadcasting the FM modulated carrier 14 to the receiver 16 via atmospheric transmission. A voltage regulator 52 regulates the voltage which is applied to both the temperature sensor signal conditioning circuit 28, the voltage control oscillator 30, and the low battery detector 54. The temperature sensor signal conditioning circuit 28 has the regulated voltage applied directly thereto and a voltage applied by a voltage divider comprised of a pair of resistors 56. The voltage provided by the voltage divider is used to provide the correct DC voltage offset required by the particular VCO. This DC voltage offset shifts the voltage controlled oscillator 30 into the desired audio frequency range. The low battery detector 54 detects if the battery voltage has dropped below a predetermined acceptable voltage. The output of the low battery detector (comparator) 54 is applied to the cathode of diode switch 58. Under normal operation, the output of the low battery detector 54 is high, which back biases diode switch 58. However, when the battery voltage goes below the predetermined value, the low battery detector 54 goes low, forward biasing the low battery diode switch 58, which causes a low level voltage signal to be applied to the voltage controlled oscillator 30. This low level voltage signal clamps the voltage controlled oscillator frequency to a preset frequency below the normal oscillation frequency range used for encoding valid temperatures which overrides the $V_{TEMP}$. In one embodiment of the present invention, a frequency range between 500 and 3000 Hz is used for frequency encoding the range of temperatures to be sensed by the present invention between $-30°$ F. and $120°$ F. (and equivalent Centigrade temperatures) and a frequency of 300 Hz is utilized for transmitting a signal to the receiver that the transmitter battery is below suitable operating potential.

In order to determine if the atmospheric transmission path of the modulated carrier 14 will severely attenuate the signal strength to a degree that valid data will not be received, a test potential may be applied when the battery 22 is initially inserted into the housing (not illustrated) of the transmitter 12 to cause a set frequency to be produced by the voltage controlled oscillator 30 which is preferably outside the frequency range for transmitting valid temperature data. The data display 20 of the receiver 16 may be checked upon powering up of the transmitter 12 for a display of the predetermined temperature (or other data) which is caused to be transmitted. If it is displayed, then the user may assume that a severely attenuated signal path has been avoided. A suitable implementation of circuitry to produce the test potential is described below with reference to FIG. 4.

Figure 3:
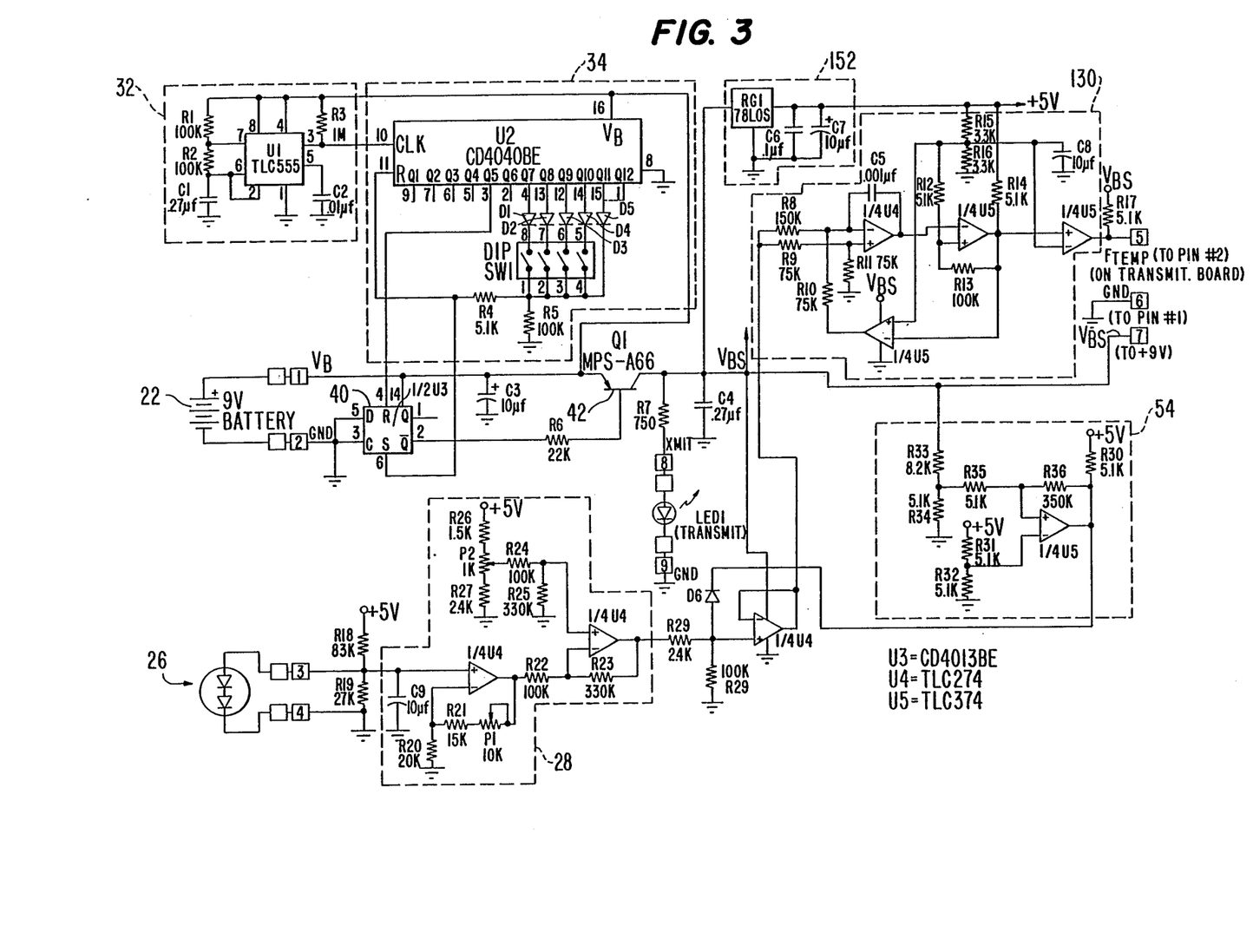
FIG. 3 is a circuit schematic of a transmitter in accordance with the present invention with the exception that an RF oscillator, modulator and antenna are omitted.

FIG. 3 illustrates an electrical schematic of an implementation of the transmitter illustrated in the block diagram of FIG. 2 with the exception that the conventional FM modulator 44 and antenna 50 have been omitted. It should be noted that dotted lines have been placed around components in the electrical schematic which are correlated to the corresponding blocks of FIG. 2 by the addition of the corresponding reference numerals. Integrated circuits have been identified by their commercial designation.

Figure 4:
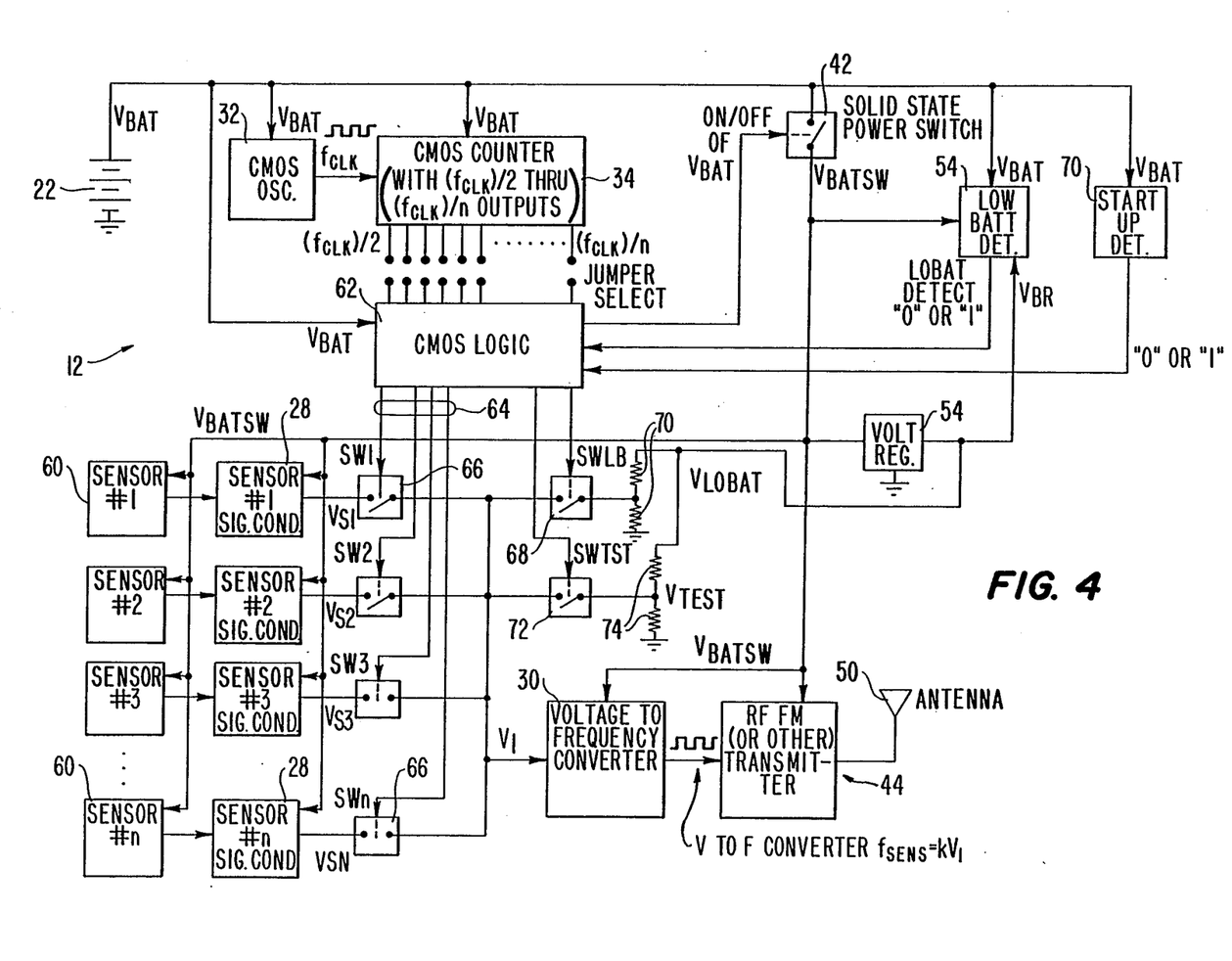
FIG. 4 is a block diagram of a second embodiment of a transmitter which may be used with the present invention which time multiplexes the transmission of data.

FIG. 4 illustrates a second embodiment of a transmitter 12 in accordance with the present invention which senses a plurality of weather parameters which are transmitted to receiver 16 by time multiplexing of the modulated carrier 14. Like reference numerals are used in FIGS. 2 and 4 to identify like parts which will not hereinafter be discussed in detail. A plurality of sensors 60, which may be any number up to n sense parameters such as temperature, wind speed, etc. A CMOS logic circuit 62, which may be implemented in combinatorial logic, controls the operation of the transmitter 12 as explained below. The particular implementation of the CMOS logic circuit 62 is not part of the present invention as any implementation may be used. A plurality of outputs 64 are provided which respectively control a plurality of solid state CMOS switches 66 which individually control the time sequential application of the output of the sensors to the voltage to frequency converter 30. Only one of these switches is closed at any instant in time during the on interval of the transmitter to cause data to be transmitted to the voltage to frequency converter 30 which produces a frequency directly proportional to the sensed parameter. The solid state power switch 42 is controlled by an output of the CMOS logic 64 in a manner analogous to the control provided by the flip/flop 40 in the embodiment of FIG. 2. The low battery detector 54 produces an output voltage which is applied to the CMOS logic 62 which causes switch 68 to close when the low battery detector signals that the battery voltage has dropped below a satisfactory level for normal operation. The voltage regulator 54 applies a regulated voltage to a voltage divider comprised of resistors 70. The potential applied by the closing of the switch 68 to the voltage to frequency converter 30 is analogous to the potential applied in the receiver embodiment of FIG. 2 to produce an output signal from the voltage to frequency converter such as 300 cycles. A start up detector 70 is providing to detect when the battery 22 is first installed. The start up detector 70 may be a circuit such as a flip/flop or Schmitt trigger. The output of the start up detector is applied to the CMOS logic 62. When the output signal from the start up detector 70 initially goes high, the CMOS logic causes switch 72 to close to apply a predetermined potential via the voltage regulator 54 to the input to the voltage frequency converter 30. The function of the predetermined voltage is to cause the carrier to be modulated by a particular frequency which is detected by the receiver and which causes the display of data demonstrating the reception of valid data from the transmitter 12. Thus, the user upon seeing the display of the data merely has to determine if it is identical to the test data which is known to be transmitted upon power up to determine if the transmission path through the atmosphere is not severely attenuated. A voltage divider having a pair of resistors 74, having relative magnitudes chosen to apply a predetermined potential to the voltage to frequency converter, causes the generation of the test transmission which may be used to determine if the receiver 16 is receiving a signal of sufficient magnitude to produce an error free data transmission. It should be noted that the embodiment of FIG. 2 may also be modified to include the generation of a test transmission in the manner described above to produce a carrier modulated with a predetermined signal which is received by the receiver 16 for the purpose of determining if a strong signal is being received to insure the error free transmission of data.

Figure 5A:
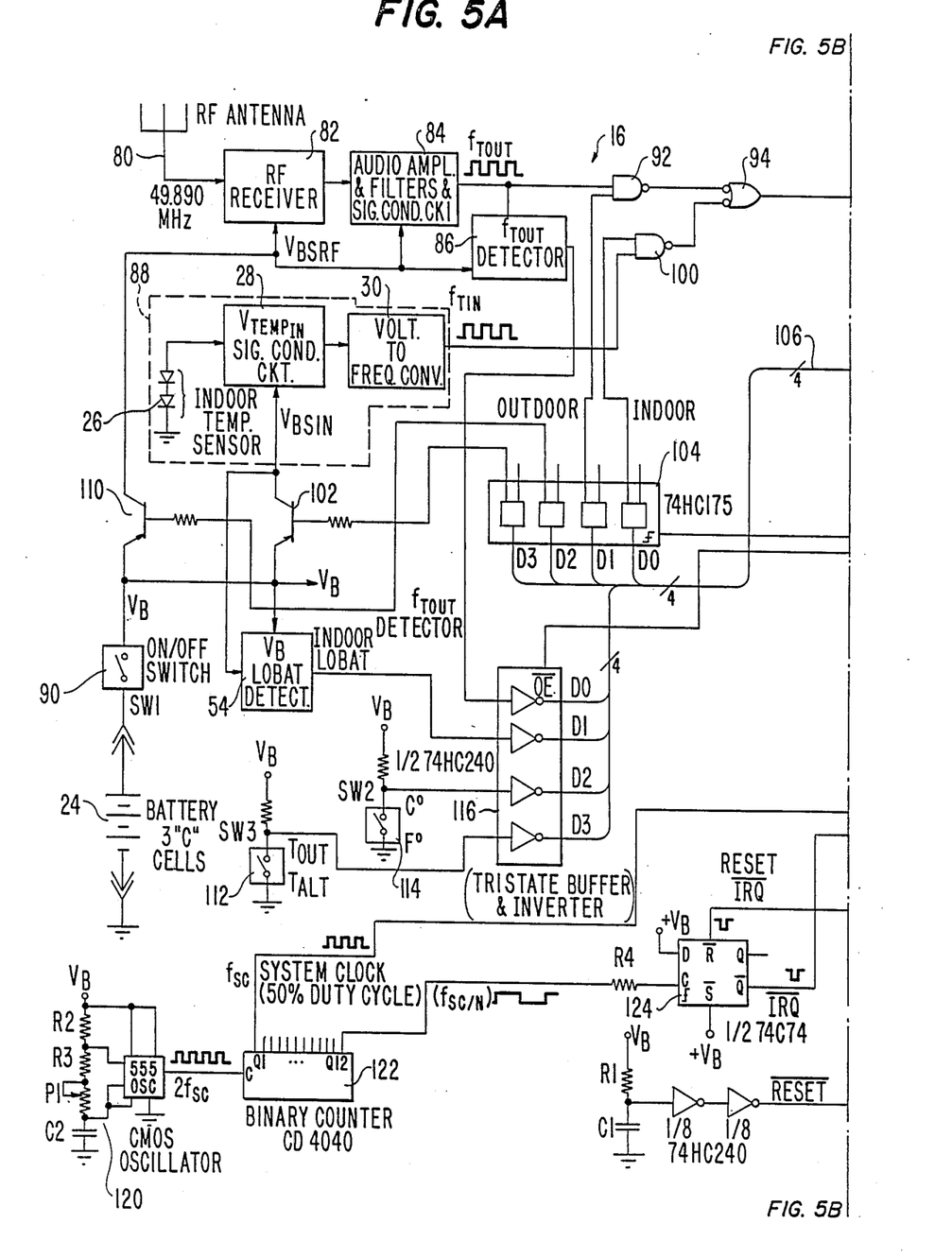
FIGS. 5(a) and 5(b) are a block diagram of a receiver which may be used with the present invention.
Figure 5B:
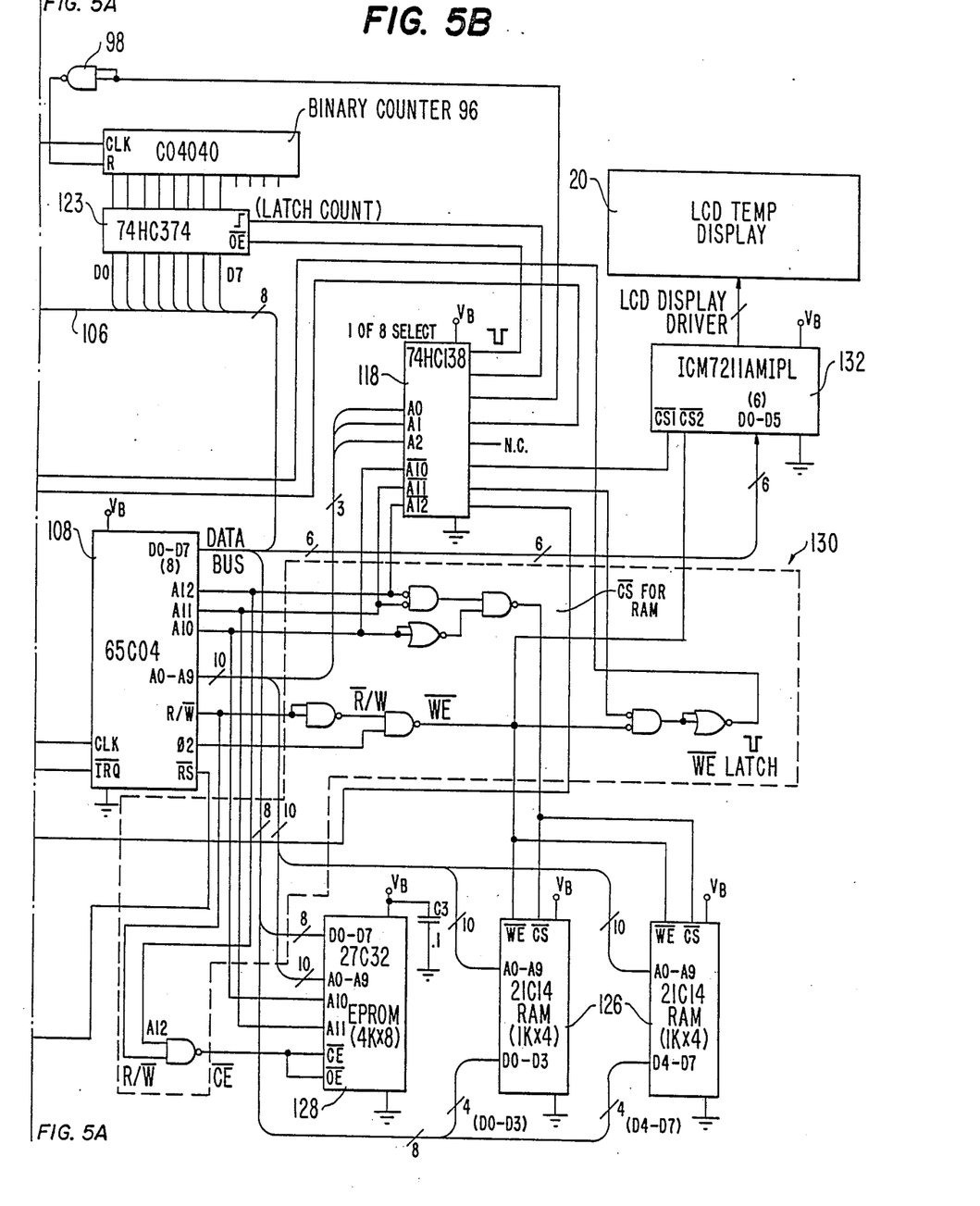

FIGS. 5a and 5b illustrate a block diagram of a receiver 16 in accordance with the present invention which processes a signal with the format transmitted by the transmitter 12 of FIGS. 1–3. Antenna 80 receives the cyclical transmissions of the modulated carrier 14 from the receiver 12. In one embodiment of the present invention, the carrier is 49.890 MHz although any frequency may be used. An RF receiver 82 of conventional design demodulates the FM signal to produce an audio signal output in the form of a pulse train having a primary frequency identical to the frequency outputted by the voltage controlled oscillator. The audio signal output is applied to an audio amplifier filter and signal conditioning circuit 84. The pulsating signal outputted from the RF receiver 82 is amplified to a suitable level and filtered by a pair of filters to eliminate both low frequency signals and high frequency signals outside the audio range to be processed by the receiver. Filtering of low frequency signals, such as 60 Hz signals produced from power lines, may be accomplished by a second order Butterworth high pass filter having an attenuation characteristic of a −12 dB per octave with the break frequency being at approximately 200 Hz. A second filter, which may be a second order Butterworth low pass filter having a −12 dB per octave attenuation characteristic with a break frequency of about 6000 Hz is also provided. The processing of the signal from the RF receiver 82 with the combination of the aforementioned two filters provides a signal envelope in a range which the receiver circuitry processes as potentially valid data. A detector 86 produces a high level signal when the audio signal is within the aforementioned signal envelope for a predetermined time interval so as to eliminate the effects of transients occurring within the signal envelope of the filters. The detector 86 may be implemented as an integration circuit having a suitable RC time constant having an output coupled to an operational amplifier used as a comparator with positive feedback. The output signal from the detector produces a high level signal when non-transient data within the pass band characteristic of the series connected Butterworth filters is present. A second temperature sensor 88, permits selective sensing of the temperature of the location of the receiver 16 such as when the receiver is located inside of a closed structure. The sensor 88 is comprised of a temperature sensor 26, a temperature sensor signal conditioning circuit 28 and a voltage to frequency converter 30 which are identical in construction to those described with reference to FIGS. 2 and 3. Battery 24, which may be comprised of three C cells, provides operating power to the receiver 16 through an on and off switch 90 which is manually closed when it is desired to operate the receiver to display the temperature at the location of the receiver 16. A first NAND gate 92 is provided for selectively gating the output signal from the audio amplifier filter and signal conditioning circuit 84 to the input of a second NAND gate 94 having an output coupled to the clock input of a binary counter 96. The counter 96 is reset by a NAND gate 98 as described below. A NAND gate 100 selectively gates the temperature output produced by the temperature sensor 88 to the aforementioned binary counter 96. The selective gating through NAND gate 92 of the output signal from the audio amplifier filter and signal conditioning circuit 84 or through NAND gate 100 from the output of the temperature sensor 88 permits the selection of the display of either the transmitted temperature data or the temperature at the location of the receiver 16. A low battery detector 54 is provided which is identical to the low battery detector of the transmitter of FIG. 2. A transistor switch 102 is selectively closed by one of the outputs from a plurality of flip/flops 104 under the control of data outputted on data bus 106 by a program microprocessor 108 as described below. A transistor switch 110 is selectively closed by another of the outputs of the plurality of flip/flops 104 under the control of the aforementioned microprocessor 108. The closing of switch 110 controls the application of power to the RF receiver 82, audio amplifier filter and signal conditioning circuit 84 and detector 86. As is explained in more detail below, in this embodiment the closing of the switch 110 is synchronized with the transmissions 14 under the control of a software timer implemented by the microprocessor 108. Switch 112 is provided for selectively choosing the display of the temperature at the location of the receiver 16 or the transmitted temperature on the LCD temperature display 20. Switch 114 permits the selection of the display of either Fahrenheit or Centigrade temperatures for each temperature sensor 26. A plurality of tristate buffers 116 are provided for selectively transmitting the signal states respectfully of the detector 86, low battery detector 54, temperature selection switch 114 and the temperature location switch 112 to the data bus 106 when an appropriate control signal is applied by address decoder 118. A CMOS oscillator 120 provides the signal $2f_{sc}$ used to generate the basic frequency $f_{sc}$ for running the clock of the microprocessor 108. Preferably, the microprocessor 108 is implemented in CMOS. Because of the relatively long off time between successive transmissions of data from the transmitter 12, the clock rate of the microprocessor 108 may be chosen to be relatively low such as 100 kilocycles to substantially lessen the power drawn by the continually running microprocessor as a result of the fact that CMOS circuits only draw current when there is a change in state which is lessened with a lowering of the basic clock rate. A binary counter 122 is provided for providing the basic clock rate of the microprocessor 108 $f_{sc}$ and a basic interrupt frequency ($f_{sc}/n$) which is used to drive a D type flip/flop 123 at a much lower frequency rate such as 4 kilohertz to generate the interrupt signal $\overline{IRQ}$ which controls the cyclical entry of the microprocessor 108 into an interrupt mode. The interrupt frequency $\overline{IRQ}$ is chosen to be relatively low in view of the fact that data is typically transmitted only once every 180 seconds for a one second interval. The interrupt frequency $\overline{IRQ}$ is used to cause the address decoder 118 to generate the latch signal for a buffer latch 124 to latch the count stored in binary counter 96 and to cause the resetting of the binary counter 96 at that time. The data latched in the buffer latch 124 is then read by the microprocessor 108 and stored in random access memory 126 in a manner described below to generate addresses for retrieving a temperature from the EPROM 128 for display on the LCD display 20. The stored count may be used as the actual address or used in calculating the address by adding the stored count to a constant offset to provide addresses in the desired sector of the EPROM 108. EPROM 128 stores the basic operating program of the microprocessor 108 and the temperature display of data for both Fahrenheit and Centigrade temperature scales. Two four-bit 1K RAMs 126 are configured together to provide 1K of 8-bit memory. Control logic 130 is provided which is configured for the specific microprocessor and associated memory which are designated by their commercial part numbers. A display driver 132 controls the LCD display.

The microprocessor 108 is programmed in accordance with a program stored in EPROM 128. In this embodiment, the microprocessor 108 functions to control the on and off cycles which are synchronized with the on and off cycles of the transmitter 12 to provide high reliability reception of data and low power consumption decoding of the received analog signal outputted by the audio amplifier, filters, and signal conditioning circuit 84 or the temperature sensor 88 to control the display of a temperature on the LCD temperature display 20. The frequency of the pulsating output signal from both the audio amplifier, filters, and signal conditioning circuit 84 and the temperature sensor 88 is directly proportional to the temperature sensed by the temperature sensor 26 located at the transmitter 12 or the receiver 16. The microprocessor functions to produce a count by sampling the signal inputted to the binary counter 96 through NAND gate 94 over a predetermined time interval. This count is used as an address (pointer) of prestored temperature values in the EPROM 128. The capacity of the counter 96 governs the number of data points of prestored temperature for both the display of Fahrenheit and Centigrade temperatures. Each number counted by the counter 96 is an address to a temperature to be displayed on both the Fahrenheit and Centigrade scales with the position of switch 114 controlling the scale being displayed. Because the range of numbers counted by counter 96 will typically be larger than the integer range of degrees to be displayed, a range of sequential counts will address a corresponding series of storage locations in the EPROM having the same stored temperature to be displayed. For example, if the range of the temperature sensor is between $-30°$ F. and $120°$ F., a total of $150°$ of range is required to be displayed. If the corresponding frequency range of the voltage controlled oscillator 30 in the transmitter or the receiver is between 500 and 3000 Hz, each successive degree of temperature will result in approximately 16.6 Hz of change in the frequency of the voltage control oscillator. Thus, approximately seventeen discrete counts of the counter 96 will address the same temperature to be displayed.

The synchronization of the transmitter 12 and receiver 16 on and off times is described with reference to FIGS. 6(a)-6(g). In the embodiment of the receiver 16 illustrated in FIGS. 5(a) and 5(b), the on and off time intervals of the receiver 16 are controlled by the program of the microprocessor 108 stored in the EPROM 128 by a software timer controlled by the basic clock frequency $f_{sc}$ output by binary counter 122. In the alternative, the on and off intervals of the receiver 16 may be controlled by a counter with jumpers like that illustrated in FIG. 2 to choose the duration of both the on and off interval. However, if the on and off intervals of the transmitter 12 and receiver 16 are programmable to the user, then care must be taken to choose the same basic on and off times to avoid the loss of synchronization in data reception.

Figure 6:
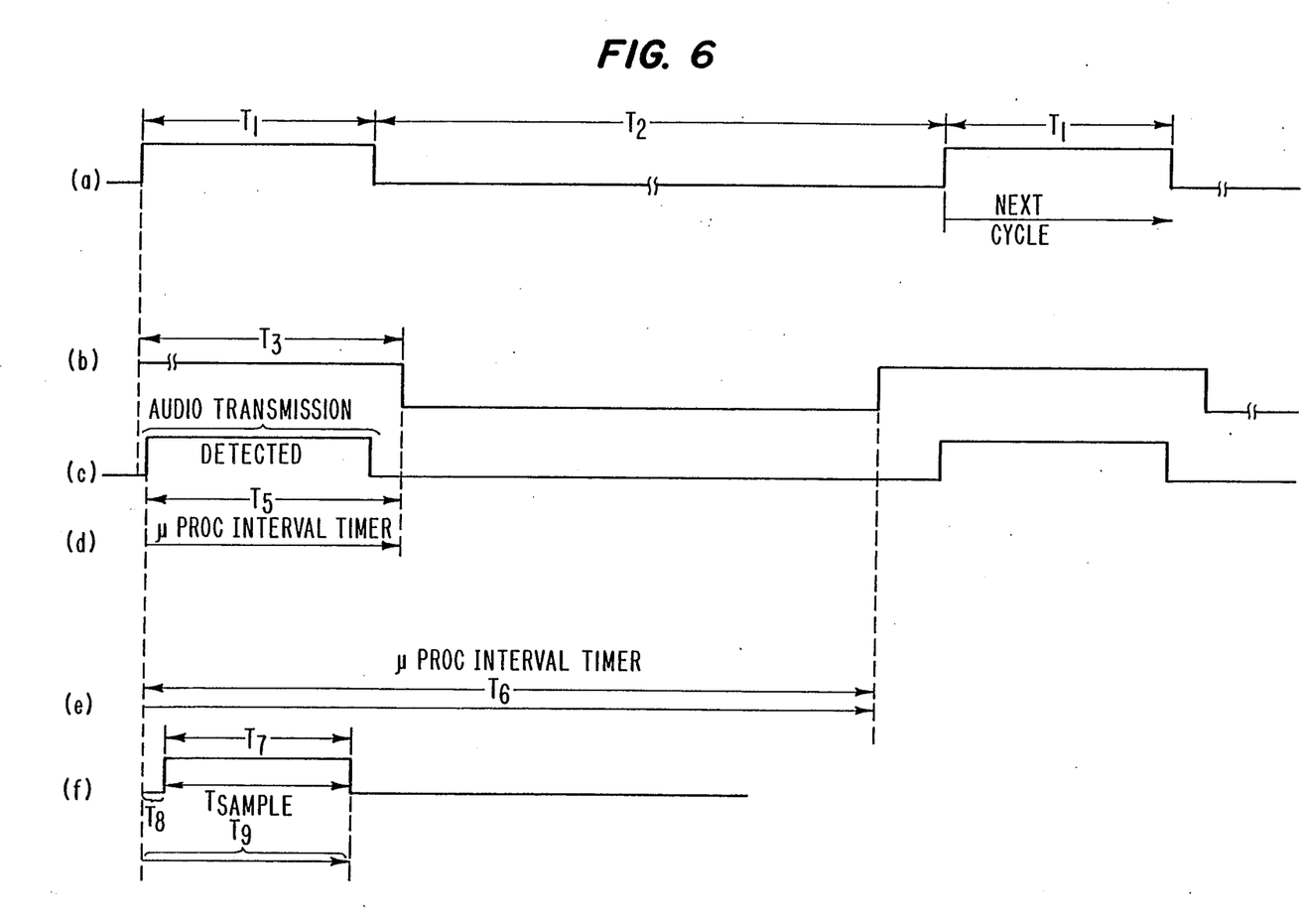
FIGS. 6(a)-6(g) are a timing diagram of various signals in the transmitter and receiver for processing transmissions of a single item of data.

FIG. 6(a) illustrates a timing diagram of the cyclical on and off intervals of the transmitter 12. The sum T of the intervals $T_1$ and $T_2$ is a constant time interval which repeats cyclically under the control of oscillator 32 and counter 34. The on time $T_1$ of the transmitter 12 in a preferred embodiment is one second or less. The off time of the transmitter $T_2$ in a preferred embodiment is 180 seconds.

FIG. 6(b) illustrates a timing diagram of the cyclical on and off times of the receiver 16 synchronized with the on and off intervals of the transmitter 12. The receiver 16 is turned on for a time interval $T_3$ which is initiated prior to the on interval of the receiver 16 with $T_3 \geq T_1$. The receiver 16 is turned off for a time interval $T_4$ with $T_4 \leq T_2$. The sum of the time intervals $T_3$ and $T_4$ is a constant time interval which repeats cyclically preferably under the control of a software based timer implemented in the microprocessor 108. The sum of $T_1$ and $T_2$ is equal to the sum of $T_3$ and $T_4$ when the transmitter 12 is synchronized to the receiver 16.

FIG. 6(c) illustrates the audio transmission which preferably is the FM modulated carrier 14. The audio information which modulates the carrier is the signal outputted by voltage controlled oscillator 30 which varies in direct proportion to the sensed temperature. The audio transmission is detected by the RF receiver 82.

FIG. 6(d) illustrates a software generated time interval $T_5$ produced by microprocessor 108 which is keyed by the detector 86 output going high that is caused by the reception of the audio transmission of FIG. 6(c). The time interval $T_5$ is chosen to be longer than $T_1$ to insure that the receiver 16 is on for the entire duration of the audio transmission of FIG. 6(c).

FIG. 6(e) illustrates a software generated time interval $T_6$ produced by microprocessor 108 which is keyed by the detector 86 going high that is caused by the reception of the audio transmission of FIG. 6(c). The time interval $T_6$ is chosen to be shorter than the sum of $T_1$ and $T_2$ to insure that the receiver is turned on prior to the transmissions 14 by the transmitter 12.

FIG. 6(f) illustrates the sampling time interval $T_7$ of the clock 96 which is controlled by microprocessor 108 as explained above. The initiation of the sampling interval $T_7$ is controlled by a software based timer $T_8$ produced by microprocessor 108 which is keyed by the detector 86 going high.

FIG. 6(g) illustrates a software based time interval $T_9$ produced by microprocessor 108 which controls the ending of the sampling interval $T_7$. The initiation of the timer $T_9$ is keyed to the detector 86 going high. The time prior to the leading edge and subsequent to the falling edge of the sampling interval $T_7$ during which data transmissions 14 occur is not used to ensure that the receiver electronics have sufficient time to stabilize prior to detection of the transmitted date for display purposes. The length of the time interval $T_7$ is used to scale the correlation between count and temperature. In other words, for a given clock frequency of the microprocessor 108, the shorter the time duration $T_7$, the less the count which is counted by counter 96 for any given temperature. $T_7$ is equal to or less than $T_1$.

Figure 7:
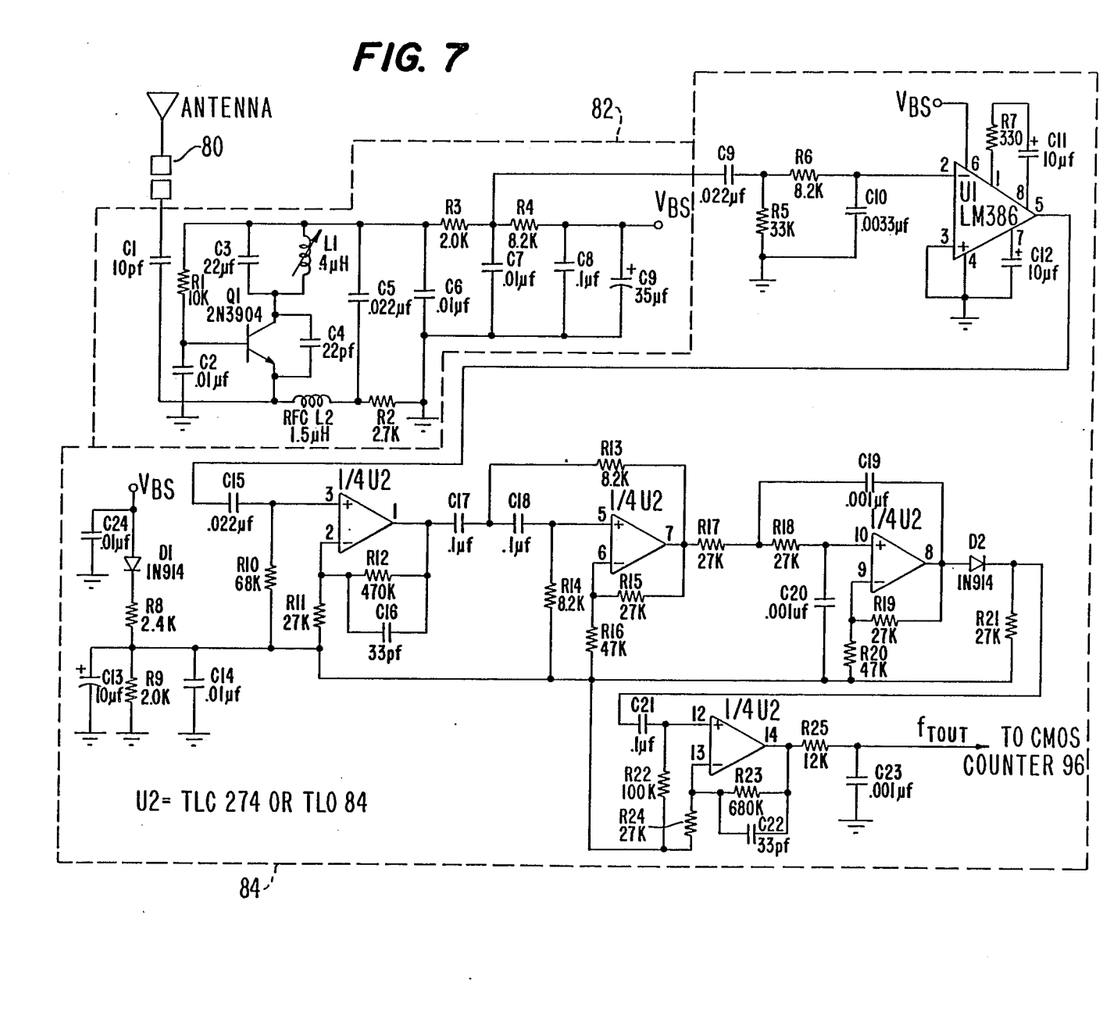
FIG. 7 is a circuit schematic of a preferred implementation of the RF receiver and audio amplifier, filters and signal conditioning circuit of FIGS. 5(a) and 5(b).

FIG. 7 illustrates a preferred implementation of the RF receiver 82 and audio amplifying filters and signal conditioning circuit 84 of FIGS. 5(a) and 5(b). Conventional integrated circuits are identified by their commercial designation. Like reference numerals are used in FIGS. 5(a), 5(b) and 7.

Figure 8:
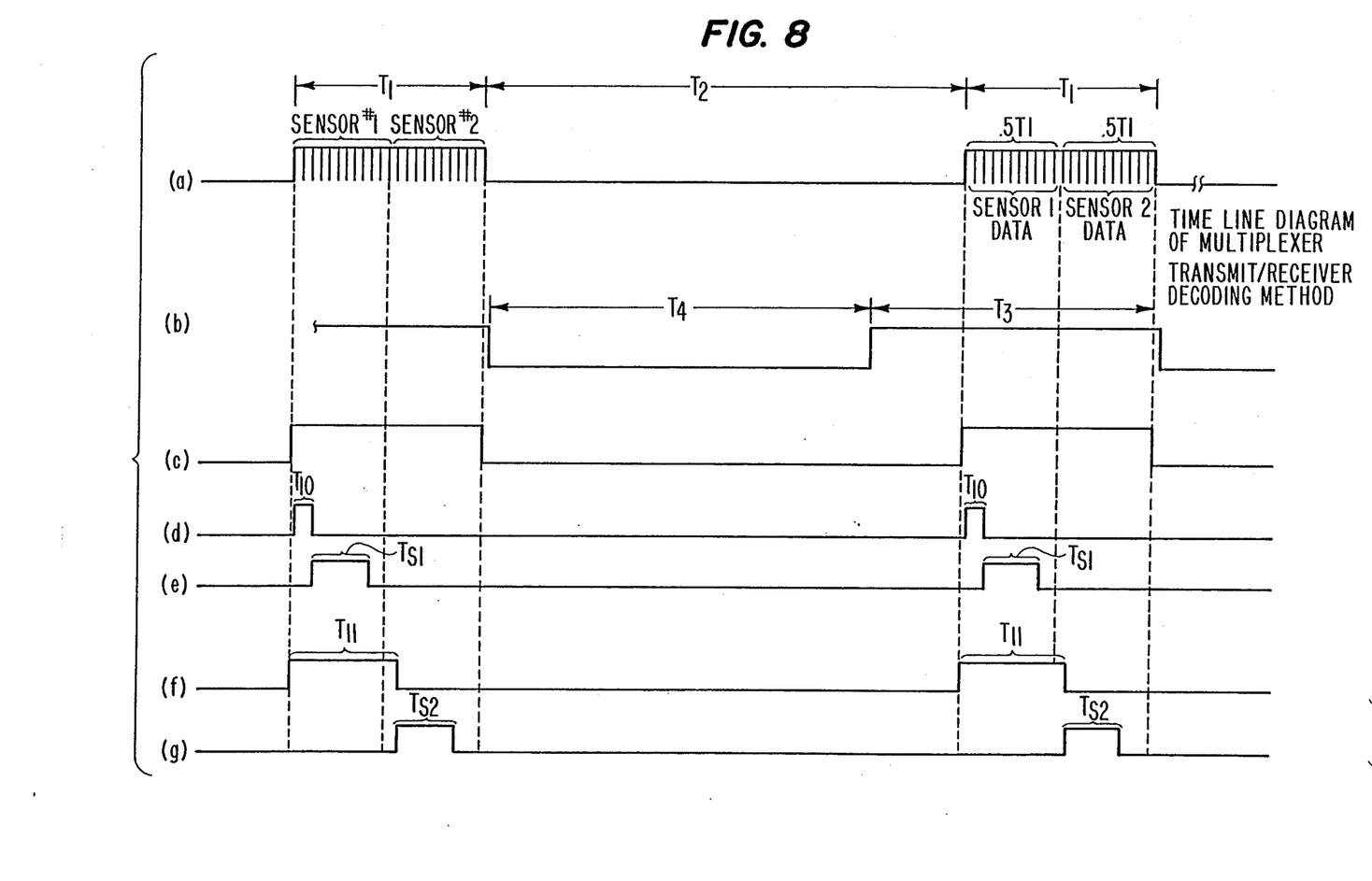
FIGS. 8(a)-8(g) are a timing diagram of various signals in the transmitter and receiver for processing time multiplexed data.

The receiver illustrated in FIGS. 5(a) and 5(b) may be used for the reception of time multiplexed data transmitted by the receiver of FIG. 4. To process time multiplexed data, the receiver of FIGS. 5(a) and 5(b) is modified to have a different control program as described below with reference to the timing diagram of FIG. 8 and further the LCD display has a plurality of different displays such as but not limited to wind speed, temperature and wind chill.

An example of the use of the receiver to display temperature, windspeed and windchill is as follows. With reference to FIG. 4, only two sensors are provided with sensor #1 being a temperature sensor as described in FIGS. 2 and 3 and sensor #2 being a wind sensor of any known construction producing an output signal directly proportional to the sensed wind. The receiver 16 detects the transmitted audio frequency in accordance with the description of FIGS. 5(a) and 5(b) above to cause the display of the temperature. Similarly, the receiver detects the transmitted audio frequency which is directly proportional to the sensed wind to cause the display of the windspeed. The counter 96 and buffer latch 124 generate the address of the windspeed to be displayed in a wind speed table set up in a manner analogous to the temperature tables described above. For each on cycle of the transmitter 12, the receiver 16 stores the detected windspeed and temperature. A table is stored in the EPROM 128 which converts the stored windspeed and temperature into a known windchill factor which is displayed on the LCD temperature display 20. The number of data points is a matter of choice. A suitable table is set forth below which has been obtained from "Climates of the United States", a U.S. Department of Commerce publication:

number of counts in the output signal from the audio amplifier, filter and signal conditioning circuit 84.

FIG. 8(f) illustrates a timing diagram of a software timer $T_{11}$ which is implemented in microprocessor 108 to control the initiation of sampling of the signal from the sensor #2. The time interval $T_{11}$ is keyed by the output signal from the detector 86 going high. The duration of interval $T_{11}$ is chosen to be such that the interval $T_{11}$ ends during the time period that sensor #2's signal is being received.

FIG. 8(g) illustrates the sample interval $T_{s2}$ which is initiated at the end of timer $T_{11}$ which controls the sampling of the signal output from the audio amplifier filter and signal conditioning circuit 84 by the counter 96 during the transmission interval of the signal from sensor #2.

As explained above, the microprocessor stores the resultant signals outputted by the buffer latch 124 as data to be displayed on the LCD display 20 and further processed in accordance with the discussion above.

The simplest manner of decoding the output fre-

| Wind speed (mph) | Dry bulb temperature (°F.) | | | | | | | | | | | | | | | |
|---|---|---|---|---|---|---|---|---|---|---|---|---|---|---|---|---|
| | 45 | 40 | 35 | 30 | 25 | 20 | 15 | 10 | 5 | 0 | −5 | −10 | −15 | −20 | −25 | −30 |
| 4 | 45 | 40 | 35 | 30 | 25 | 20 | 15 | 10 | 5 | 0 | −5 | −10 | −15 | −20 | −25 | −30 |
| 5 | 43 | 37 | 32 | 27 | 22 | 16 | 11 | 6 | 0 | −5 | −10 | −15 | −21 | −26 | −31 | −36 |
| 10 | 34 | 26 | 22 | 16 | 10 | 3 | −3 | −9 | −15 | −22 | −27 | −34 | −40 | −46 | −52 | −58 |
| 15 | 29 | 23 | 16 | 9 | 2 | −5 | −11 | −18 | −25 | −31 | −38 | −45 | −51 | −58 | −65 | −72 |
| 20 | 26 | 19 | 12 | 4 | −3 | −10 | −17 | −24 | −31 | −39 | −46 | −53 | −60 | −67 | −74 | −81 |
| 25 | 23 | 16 | 8 | 1 | −7 | −15 | −22 | −29 | −36 | −44 | −51 | −59 | −66 | −74 | −81 | −88 |
| 30 | 21 | 13 | 6 | −2 | −10 | −18 | −25 | −33 | −41 | −49 | −56 | −64 | −71 | −79 | −86 | −93 |
| 35 | 20 | 12 | 4 | −4 | −12 | −20 | −27 | −35 | −43 | −52 | −58 | −67 | −74 | −82 | −89 | −97 |
| 40 | 19 | 11 | 3 | −5 | −13 | −21 | −29 | −37 | −45 | −53 | −60 | −69 | −76 | −84 | −92 | −100 |
| 45 | 18 | 10 | 2 | −6 | −14 | −22 | −30 | −38 | −46 | −54 | −62 | −70 | −78 | −85 | −93 | −102 |

For example, if the stored wind speed was 15 mph and the temperature was 45° F., the microprocessor 108 would process these parameters to cause the display on the LCD display 20 of 29° F. FIGS. 8(a)-8(g) are a timing diagram of the signals present in a multiplexed transmission of data from two sensors in the transmitter of FIG. 4 and the reception thereof in the receiver of FIGS. 5(a) and 5(b). Like time intervals are identified in FIGS. 5(a)-5(g) and FIGS. 8(a)-8(g) by the same designations.

FIG. 8(a) illustrates the parts of the time multiplexed output signal from the transmitter in interval $T_1$ by the designations "sensor #1" and "sensor #2". Each of the intervals for sensor #1 and sensor #2 are equal to one-half of the total time $T_1$.

FIG. 8(b) illustrates the timing diagram of the receiver on interval $T_3$ and the receiver off interval $T_4$. As is apparent from a comparison of FIGS. 8(a) and 8(b), interval $T_3$ is longer than interval $T_1$ although the amount of the difference in length is not critical.

FIG. 8(c) illustrates the output signal from the detector 86. As is apparent from a comparison of FIGS. 8(a) and 8(c), the output signal from the detector 86 is synchronized with the transmission interval $T_1$ of the transmitter 12.

FIG. 8(d) illustrates a timing diagram of a software timer $T_{10}$ which is implemented in the microprocessor 108. The duration of time interval $T_0$ is chosen to control the initiation of sampling of the first multiplexed signal from sensor #1. The length of interval $T_{10}$ should be sufficient to permit the receiver electronics to have stabilized.

FIG. 8(e) illustrates a time diagram of the sample interval $T_{s1}$ during which the counter 96 counts the quency from the audio amplifier, filters and signal conditioning circuit 84 or the temperature sensor 88 is to count all of the cycles transmitted by the transmitter 12 or outputted by the temperature sensor 88. This can be accomplished by using the change in the detector 86 to the high level to control the gating of the output signal directly to the binary counter 96 with the sampling interval being equal to $T_1$ (not illustrated in FIGS. 6(a)-6(f) described above). The only limiting factor is the speed with which the detector 86, microprocessor 108 and gate 92 responds to the receipt of the modulated carrier. Alternatively, in order to avoid the possibility of erroneous counts occurring as a consequence of irregularities in the leading and trailing edges of the transmission of the modulated carrier 14 or because of instabilities in the receiver 18 as a result of initial turning on and off the microprocessor 108 may have the sampling interval less than $T_1$ as illustrated in FIGS. 6(a) and 6(f) as described above so that sampling is initiated when the modulated carrier is likely to be up to level and the receiver is stable. At the time of initiation of sampling by the microprocessor 108, the microprocessor resets the binary counter via an output signal from the address decoder 118 by means of the NAND gate 98. Upon initiation of sampling, the sampling interval $T_7$ is activated which has a time interval less than $T_1$ and which ends prior to the ending of $T_1$. At the end of $T_7$, the buffer latch 124 is latched prior to the trailing edge of the transmission of the modulated carrier 14. This mechanism insures that data errors consequent from proximity to the leading and trailing edge of the modulated carrier 14 and receiver instability are avoided.

In order to lessen the number of temperature data points which must be stored in the Fahrenheit and Centigrade tables of the EPROM, the pulse train applied to the clock 96 during a single transmission may be broken down into a plurality of equal intervals such as four. The counter 96 is set and reset for each of the four intervals within the transmission of the modulated carrier. An average count is computed for the four counts which is used as the address for fetching a temperature to be displayed. Averaging lessens the chance for error based upon a single sample of a duration equal to one of the four samples. Moreover, the capacity of the counter 96 and the number of data points in the temperature tables in the EPROM are lessened by dividing the transmission interval into equal intervals because a smaller number of counts can be counted during the smaller equal intervals than during the entire interval.

A second mechanism for minimizing the effect of extraneous transmissions or noise which are present in the audio band which the audio amplifier, filters and signal conditioning circuit 84 are designed to pass is the activation of a software based timer implemented in the microprocessor 108 in response to the output of the detector 86 going high to time the duration of the received signal. If the audio output signal has a duration differing by more than a predetermined magnitude from the predetermined time duration of transmission from the transmitter 12, such as one second, the resultant output data will not be utilized in updating of the LCD temperature display 20.

An additional method of minimizing the possibility of erroneous data effecting the accuracy of the LCD temperature display 20 is to compute an average of the output count from the binary counter 96 during the last m transmissions of the modulated carrier 14 (m is an integer). Each successive output count from the binary counter 96 is compared with the average to determine if there is a difference greater than a predetermined difference which, for example, may be 15 or 20% of the average count. If the current count is less than or greater than the average by the difference, then the current count is buffered to determine if the next successive count differs from the buffered count by less than the predetermined difference in which case the buffered count and the current count is used to update the display on the LCD temperature display 20.

A subroutine may be used to control the display of temperatures below zero without the storing of a sign bit in the actual temperature. This subroutine compares the output count from the buffer latch 124 with a predetermined number. If the count is below the predetermined number, the below zero sign is displayed.

A subroutine may also be used to save the storage of a one in the hundred's place for displaying temperatures above one hundred degrees. This subroutine compares the output count from the buffer latch with a predetermined number. When the count is equal to or greater than the predetermined number, the "1" digit in the one hundred's place is displayed.

The microprocessor 108 is programmed to detect the loss of reception of the modulated carrier 14. In this case a software based timer initiated by the transitions of the output signal of the detector 86 during the last correctly received modulated carrier produces the time intervals $T_3$ and $T_4$ for any number of cycles in which a modulated carrier has not been correctly received.

The possibility exists that the receiver 16 will lose synchronization in turning on when transmitter 12 transmits data which makes it statistically unlikely that valid data will be received. In order to achieve rapid resynchronization, the microprocessor monitors the output of the detector 86. If the output of the detector 86 fails to go high during a time interval which is a plurality of cycles long, the receiver 16 is turned on continually until the modulated carrier 14 is again received which resynchronizes the system.

Furthermore, when each transmission of the modulated carrier 14 is broken down into equal intervals at the receiver 16, the statistically aberrant counts such as the highest and lowest count may be discarded to further protect against noise.

It should be understood that the averaging techniques described above regarding the embodiment transmitting a single sensor's data may be applied to embodiments of the invention transmitting data in a time multiplexed manner as described above.

While the invention has been described in terms of its preferred embodiments, it should be understood that numerous modifications may be made thereto without departing from the spirit and scope of the appended claims. It is intended that all such modifications fall within the scope of the invention.

I claim:

1. A system for transmitting a temperature sensed by a sensor disposed at a first location to a second location by modulation of a carrier, with a signal which is a function of the sensed temperature, transmitted by atmospheric transmission of the carrier between the first and second locations comprising:
   (a) a transmitter, which is cyclically turned on to transmit the carrier modulated by the sensed temperature during a first time interval and turned off during a second time interval;
   (b) a transmitter clock for controlling the cyclical turning on and off of the transmitter during the first and second time intervals;
   (c) a battery power supply for providing operating power to the transmitter when turned on and power continually to the transmitter clock;
   (d) a receiver, disposed at the second location, which is cyclically turned on for receiving the modulated carrier during a third time interval and turned off during a fourth time interval, the receiver including means for detecting the signal modulating the carrier, means for displaying the sensed temperature, and a receiver clock for controlling the cyclical turning on and off of the receiver during the third and fourth time intervals, the fourth time interval starting in response to a change in a level of the received modulated carrier; and
   (e) a battery power supply for providing operating power to the receiver when turned on and power continually to the receiver clock.

2. A system in accordance with claim 1 wherein the means for detecting comprises:
   (a) a memory having a plurality of addressable locations with each location storing a single temperature;
   (b) means for reading a temperature stored in the memory corresponding to the detected signal; and wherein
   (c) the means for displaying displays the temperature which has been read from the memory.

3. A system in accordance with claim 2 wherein:

the detected signal is a function of an address in the memory which stores the temperature to be displayed.

4. A system in accordance with claim 2 wherein the transmitter includes:
a voltage controlled oscillator which has an output frequency which varies in direct proportion to the sensed temperature.

5. A system in accordance with claim 1 wherein the transmitter clock comprises:
(a) a source of a constant frequency signal; and
(b) a counter, coupled to the source of a constant frequency signal, for counting the number of cycles of the constant frequency signal and producing a plurality of selectable output signals each of a different duration, one of the outputs producing a signal of the first time interval and another of the output signals producing a signal of the second time interval.

6. A system in accordance with claim 1 wherein the receiver clock comprises:
(a) a source of a constant frequency signal; and
(b) a counter, coupled to the source of a constant frequency signal, for counting the number of cycles of the constant frequency signal and producing a plurality of selectable output signals each of a different duration, one of the outputs producing a signal of the third time interval and another of the output signals producing a signal of the fourth time interval.

7. A system in accordance with claim 4 wherein:
(a) the means for detecting produces a signal of a first level when the detected signal is within a predetermined frequency range for at least a predetermined time and a second level when a signal is not detected within the predetermined frequency range for the predetermined time; and further comprising;
(b) means for comparing the duration of the signal of the first level with a predetermined duration and causing the detected signal to be used in the display of a temperature when the duration of the signal of the first level differs from the predetermined duration by a set time.

8. A system in accordance with claim 1 wherein the transmitter and receiver clocks are implemented with CMOS.

9. A system in accordance with claim 1 further comprising:
(a) means for detecting the signal from the modulated carrier to produce a signal of a first level when the detected signal has a predetermined characteristic and for producing a signal of a second level when the predetermined characteristic is not present in the detected signal;
(b) means for comparing the duration of the signal of the first level with a predetermined duration and causing the detected signal to be used in the display of a temperature when the duration of the signal of the first level differs from the predetermined duration by an amount less than a set time.

10. A system in accordance with claim 4 wherein the means for detecting further comprises:
(a) means for producing a pulse train from the received carrier with the pulse train having a frequency directly proportional to the sensed temperature;
(b) means for counting which produces a count of a number of pulses present in the pulse train which occur during a predetermined time interval; and wherein
(c) the count of the means for counting is an address in the memory which stores the temperature to be displayed.

11. A system in accordance with claim 1 wherein the receiver further comprises:
(a) means for detecting when the modulated carrier is not detected during the third time interval for a predetermined time; and (b) means responsive to the means for detecting, for detecting when of the modulated carrier is not detected for a predetermined time, for turning the receiver continually on until the modulated carrier is again received.

12. A system in accordance with claim 10 wherein predetermined time is a plurality of cycles.

13. A system in accordance with claim 1 wherein the fourth time interval starts a predetermined time after the detection of a leading edge of the modulated carrier.

14. A system in accordance with claim 1 wherein the fourth time interval starts in response to a trailing edge in the transmission of the modulated carrier.

15. A system in accordance with claim 1 further
(a) means for producing a pulse train from the received carrier with the pulse train having a frequency directly proportional to the received temperature;
(b) means for dividing each pulse train into n equal intervals wherein n is an integer and for counting the number of pulses in each interval;
(c) means for averaging the of the number of pulses in the intervals counts;
(d) a memory having a plurality of addressable locations with each location storing a single temperature with the memory having a number of locations storing a single temperature which is equal to the maximum count that the means for dividing and counting can count; and
(e) means for addressing the temperature to be displayed in the memory with the averaged count.

16. A system in accordance with claim 15 further comprising:
means for selecting a number of the counts of a number of intervals less than n during a single pulse train with statistically aberrant counts being eliminated from the selected counts used in the display of the sensed temperature.

17. A system in accordance with claim 1 further comprising:
(a) means for producing a pulse train from the received carrier for each on cycle of the transmitter with the pulse train having a frequency directly proportional to the sensed temperature;
(b) means for averaging the count of the number of pulses in each pulse train for a plurality of on cycles of the transmitter to produce a pulse train average; and
(c) means for comparing the count of the number of pulses in a single received pulse train with the pulse train average and for not using the single pulse train in the display of temperature if the number of pulses in the single received pulse train differs from the average by more than a predetermined amount.

18. A system in accordance with claim 17 further comprising:

means for storing each individual count which is not used in the display as a result of differing from the average by more than a predetermined amount and using each individual count differing by the predetermined amount in the display when a plurality of consecutive counts differing by the predetermined amount differ from each other by less than the predetermined amount.

19. A system in accordance with claim 1 wherein:
(a) the first time interval is less than or equal to the third time interval;
(b) the fourth time interval is less than or equal to the second time interval; and
(c) the sum of the first and second time intervals is equal to the sum of the third and fourth time intervals when the transmitter and receiver are synchronized.

20. A system for transmitting data sensed by a sensor disposed at a first location to a second location by modulation of a carrier, with a signal which is a function of the sensed data, transmitted by atmospheric transmission of the carrier between the first and second locations comprising:
(a) a transmitter, which is cyclically turned on to transmit the carrier modulated by the sensed data during a first time interval and turned off during a second time interval;
(b) a transmitter clock for controlling the cyclical turning on and off of the transmitter during the first and second time intervals;
(c) a battery power supply for providing operating power to the transmitter when turned on and power continually to the transmitter clock;
(d) a receiver, disposed at the second location, which is cyclically turned on for receiving the modulated carrier during a third time interval and turned off during a fourth time interval, the receiver including means for detecting the signal modulating the carrier, and a receiver clock for controlling the cyclical turning on and off of the receiver during the third and fourth time intervals, the fourth time interval starting in response to a change in a level of the received modulated carrier and the fourth time interval being less than or equal to the duration of the second time interval; and
(e) a battery powered supply for providing operating power to the receiver when turned on and power continually to the receiver clock.

21. A system for transmitting a plurality of weather variables by a plurality of sensors disposed at a first location to a second location by time multiplex modulation of a carrier, with a plurality of time multiplexed signals which each signal being a function of a different weather variable, transmitted by atmospheric transmission of the carrier between the first and second locations comprising:
(a) a transmitter, which is cyclically turned on to transmit the carrier which is modulated by time multiplexing by the sensed weather variables during a first time interval and turned off during a second time interval;
(b) a transmitter clock for controlling the cyclical turning on and off of the transmitter during the first and second time intervals;
(c) a battery power supply for providing operating power to the transmitter when turned on and power continually to the transmitter clock;
(d) a receiver, disposed at the second location, which is cyclically turned on for receiving the modulated carrier during a third time interval and turned off during a fourth time interval, the receiver including means for detecting the time multiplexed signals modulating the carrier, means for displaying the plurality of weather variables and a receiver clock for controlling the cyclical turning on and off of the receiver during the third and fourth time intervals, the fourth time interval starting in response to a change in a level of the received modulated carrier; and
(e) a battery power supply for providing operating power to the receiver when turned on and power continually to the receiver clock.

22. A system in accordance with claim 21 wherein:
(a) the plurality of weather variables are temperature and wind speed of the first location; and wherein said receiver further comprises
(b) means for computing windchill from the wind speed and temperature of the first location, and
(c) said means for displaying displays at least the computed windchill.

23. A system in accordance with claim 21 wherein:
(a) the first time interval is less than or equal to the third time interval;
(b) the fourth time interval is less than or equal to the second time interval; and
(c) the sum of the first and second time intervals is equal to the sum of the third and fourth time intervals when the transmitter and receiver are synchronized.

* * * * *